Figure 1:
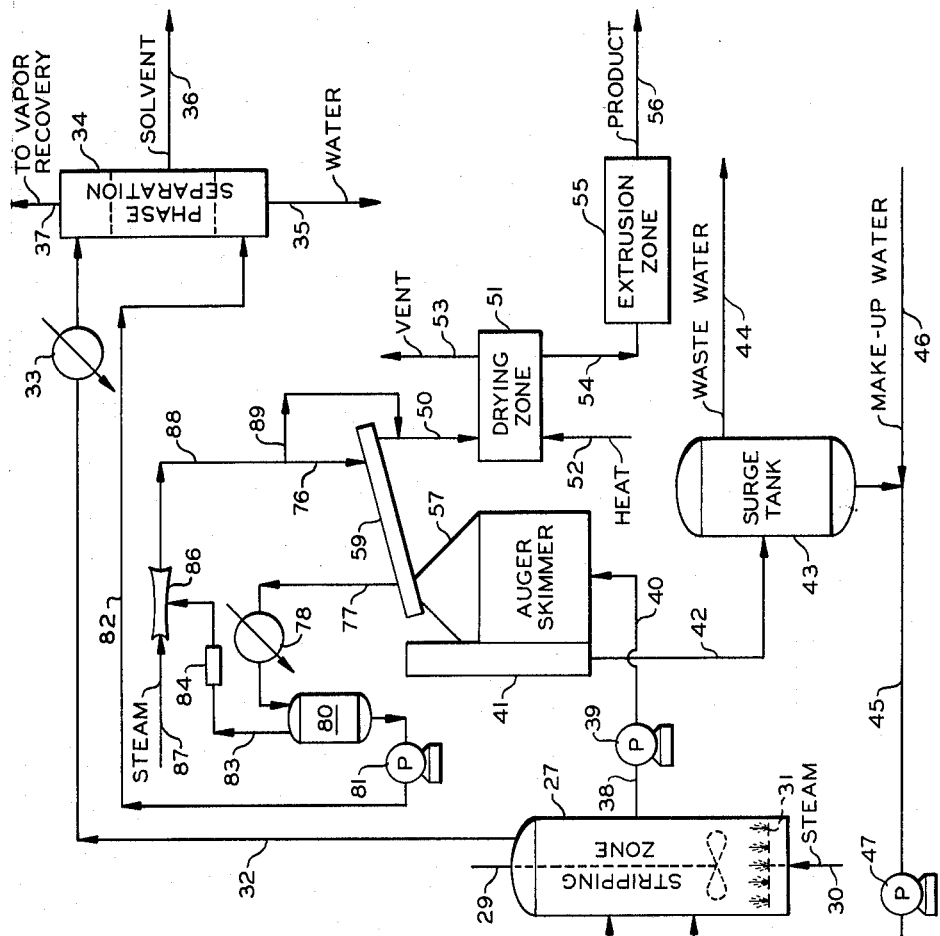
Figure 1:
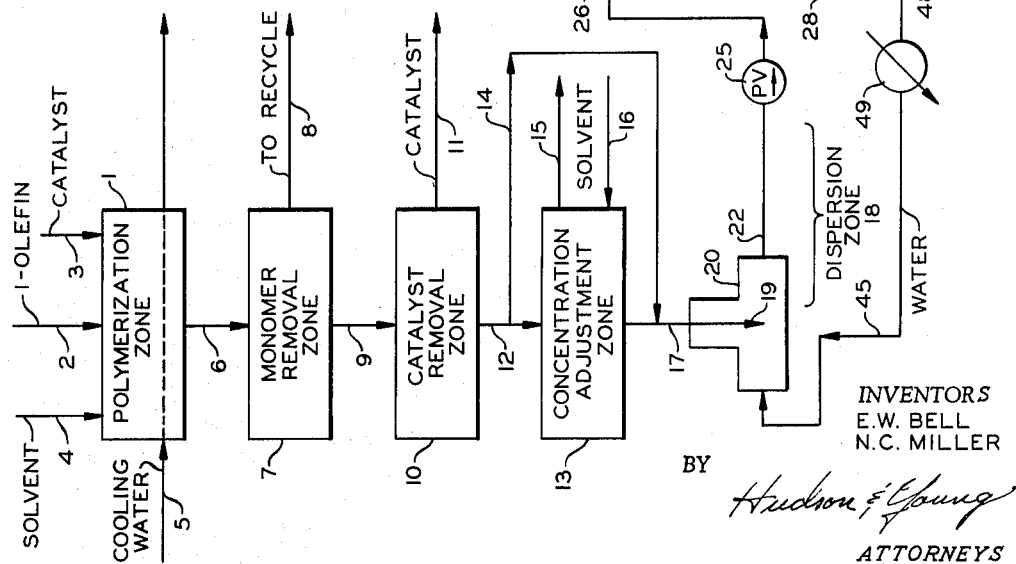

June 21, 1966 E. W. BELL ETAL 3,257,374
METHOD AND APPARATUS FOR RECOVERY OF VOLATILE MATERIALS
FROM FLOTATION SOLIDS
Filed Oct. 27, 1958 2 Sheets-Sheet 1

INVENTORS
E.W. BELL
N.C. MILLER
BY
*Hudson & Young*
ATTORNEYS

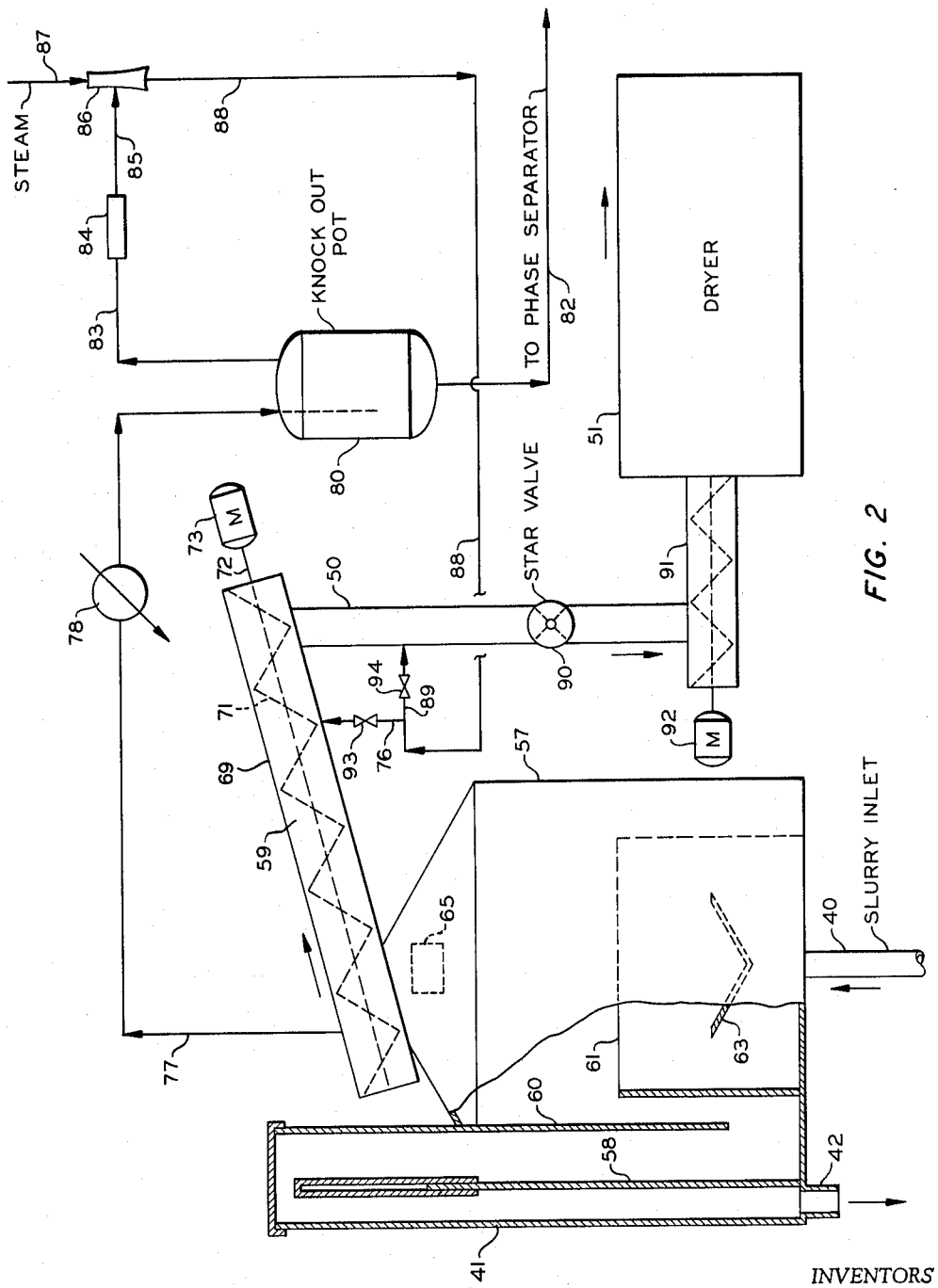

United States Patent Office 3,257,374
Patented June 21, 1966

3,257,374
METHOD AND APPARATUS FOR RECOVERY OF VOLATILE MATERIALS FROM FLOTATION SOLIDS
Evan W. Bell, Bartlesville, Okla., and Neil C. Miller, Pasadena, Tex., assignors to Phillips Petroleum Company, a corporation of Delaware
Filed Oct. 27, 1958, Ser. No. 769,917
5 Claims. (Cl. 260—94.9)

This invention relates to the separation of volatile material from solids as they are removed from a slurry of said solids in liquid containing said volatile material. In its more limited aspects this invention relates to a method and apparatus for removal of residual hydrocarbon solvent from polymer as it is continuously skimmed from a slurry of polymer in water.

Flotation is a common method of removing buoyant or floatable solids from a slurry in liquid. This method has been successfully applied to remove finely divided polymer solids from a slurry of said polymer in water following precipitation of said polymer from solution in a hydrocarbon solvent. Since a considerable amount of volatile hydrocarbon is carried with the polymer solids as they are removed from the bulk of the liquid, it is desirable from a safety and health standpoint as well as for economy that this solvent be removed and recovered before the polymer is dried. This method of polymer recovery using a skimming system with subsequent vaporization of residual hydrocarbon solvent carried with the polymer is described in the copending application of Robert R. Goins, Serial No. 700,141, filed December 2, 1957, now U.S. 2,957,861.

In separation processes such as described in the above-mentioned copending application solid polymer is precipitated from solution by mixing the solution with water, thereby cooling the solution, evaporating the bulk of the solvent leaving a slurry of polymer solids in water, skimming the buoyant polymer from the surface of the water, and stripping residual solvent from the polymer solids before drying same. As the volatile hydrocarbon is stripped from the polymer solids a non-condensable gas is generally pressent, either by inadvertence or design. Generally, the stripping gas employed is steam and the inert or non-condensable gas is nitrogen which either is added to the stripping system to aid in solvent removal or leaks into the stripping zone from the dryer which uses a nitrogen blanket. The volatilized hydrocarbon solvent is recovered by condensing the vapor and separating the organic layer from condensed water. In this operation it has been necessary to vent non-condensable gases present and with these vented gases are lost equilibrium quantities of solvent vapor.

According to my invention, losses of solvent vapor and non-condensable gases are eliminated with a considerable savings in steam. This can be realized by recycling the non-condensable gases with fresh tripping gas, such as steam, to the stripping zone. It is preferred that a steam ejector be employed to circulate the gases through the stripping zone. In this manner the inert gases are passed to the steam ejector and, according to my invention, are combined with the steam in the ejector and recycled to the stripping zone to contact the polymer. Thus the same steam can be used for stripping gas and to operate the ejector. The condenser employed to condense the steam and solvent vented from the stripping zone also serves the steam ejector. The system is closed with respect to the non-condensable gas so that there is no loss of this material. The problem of inert gases, such as nitrogen, leaking from the dryer into the stripping zone is eliminated.

It is an object of our invention to provide an improved method and apparatus for stripping volatile components from solids removed from a slurry by flotation. Another object of our invention is to provide an improved method of separating residual solvent from polymer solids by contacting same with stripping gas prior to passing the polymer to a dryer. Another object is to reduce the losses of solvent and non-condensable stripping gases in such a separation process. Still another object is to reduce the amount of steam required to remove the residual hydrocarbon solvent from the polymer solids. Other objects, advantages and features of our invention will be apparent from the following description and drawings in which:

FIGURE 1 is a schematic flow diagram of an olefin polymerization process and polymer recovery operation employing the improved method of our invention; and FIGURE 2 is a schematic diagram showing in greater detail the polymer skimming operation with subsequent steam stripping of polymer solids and recycle of non-condensable gases.

While we will describe our invention in conjunction with olefin polymerization and the separation of hydrocarbon solvent from the solid polymer made thereby, it should be understood that in its broader aspects our invention can be advantageously applied to the separation of any residual volatile material from floatable solids which are removed from a solid-in-liquid slurry by skimming the solids from the surface of the liquid and elevating them above said surface to allow entrained liquid to drain from the solids. Our invention is particularly advantageous where the recovered solids are passed directly to a dryer employing inert gas, such as nitrogen, which is to be conserved as much as possible.

Solid olefin polymers can be prepared by contacting the olefin to be polymerized with a catalyst at an elevated temperature and pressure, often in the presence of a solvent or diluent material. The reaction product can be one of a wide variety of olefin polymers, such as for example, polymers or copolymers of monoolefins like ethylene, propylene, butylene, etc., also copolymers of these monoolefins and diolefins such as butadiene, isoprene, etc. The operating variables of the polymerization process do not form a part of our invention. The preferred polymerization method is described in detail in the patent of Hogen et al., U.S. 2,825,721.

Other polymerization methods can be used to prepare solid olefin polymers. For example polymers of this nature can be prepared in the presence of organo metallic compounds, such as triethylaluminum plus titanium tetrachloride, mixtures of ethylaluminum halides with titanium tetrachloride, and the like. Ethylene polymerizations with catalyst systems containing a Group IV metal halide as an organometal or an organometallic halide are described in the copending U.S. application of H. D. Lyons and Gene Nowlin, Serial No. 495,054, filed March 17, 1955.

In such polymerization processes as above described the solvent or diluent employed includes naphthenic or paraffinic hydrocarbons which can at least partially dissolve the polymers at the temperature of polymerization. Aromatic diluents can also be employed depending upon the catalyst. Useful solvents are, for example, paraffins having from 3 to 12 carbon atoms per molecule, such as propane, isobutane, n-pentane, isopentane, isooctane, dodecane and the like. Naphthenic hydrocarbons, such as cyclohexane and methylcyclohexane, are also useful. Diluents thus employed are relatively inert and in the liquid state at the reaction conditions.

Polymerization solvents or diluents are generally employed to carry the reaction product from the reaction zone to subsequent recovery operations. Solid polymers can be separated from the solvent in a number of methods. In one method the polymer solution is sprayed into liquid water so that the solid polymer is dispersed in the water as it is precipitated from solution. Such a process is described in detail in the copending application of R. G. Wallace, Serial No. 584,812, filed May 14, 1956, now abandoned.

As a result of precipitating solid polymer by spraying the solution of polymer in solvent into liquid water, a slurry of liquid and polymer is formed in a mixture of water and solvent. To obtain the desired dry product the slurry is generally treated first for the removal of a major portion of the solvent by steam stripping and then for the removal of a major portion of the water by flotation. Our invention is applied to the solid polymer recovered by said flotation as the polymer is skimmed from the bulk of water present. As the water is allowed to drain from the polymer, stripping gases are contacted with the polymer solids to vaporize any solvent which may be carried with the polymer.

To more fully describe our invention, the process of polymerization and the subsequent polymer recovery will be discussed in conjunction with the drawings.

Referring now to FIGURE 1, a feed stream consisting essentially of polymerizable monoolefin, ethylene for example, is passed to polymerization zone 1 via conduit 2. A chromium oxide catalyst, containing hexavalent chromium, associated with silica-alumina is introduced to said polymerization zone via conduit 3. The catalyst is usually dispersed in at least a portion of the solvent. Any additional solvent (cyclohexane) is added to polymerization zone 1 via conduit 4. The ingredients in each of these conduits 2, 3 and 4 are preferably at polymerization temperatures (230–330° F.); however, one or more streams can be cooler with remaining streams warmer so that the resulting dispersion is at the proper temperature. It should also be understood that the monoolefin and solvent can be premixed, if desired. The polymerization reaction is exothermic so that it is necessary to remove heat from the polymerization zone. This can be accomplished by indirect heat exchange, for example, cooling water in conduit 5.

The polymerization zone effluent, at about 280° F. from zone 1 passes va conduit 6 to monomer removal zone 7 wherein unreacted ethylene is vaporized and removed via conduit 8 to ethylene recycle and any undissolved polymer is dissolved by heating, additional solvent being added as desired. The mixture passes from monomer removal zone 7 via conduit 9 to catalyst removal zone 10 wherein the solution and catalyst are separated, catalyst being removed through line 11.

The polymer solution is passed from separation zone 10 to polymer concentration zone 13 via conduit 12. Zone 13 can be by-passed, if desired, via conduit 14. In general, the polymer concentration in conduit 12 is low and solvent is removed from zone 13 via conduit 15. On the other hand, if the concentration is high, solvent can be added via conduit 16. The solution is cooled in this zone, either by evaporation or by adding cool solvent, to about 240° F. The polymer concentration may, for example, be adjusted to about 4.5 percent polymer. In any case, the solution is passed to dispersion zone 18 wherein the polymer solution is dispersed in water of lower temperature so as to cause polymer to precipitate under such conditions that both the water and solvent remain as liquid phases. In this embodiment, the solution passes from conduit 17 through nozzle 19 into a stream of water in pipe T 20. Nozzle 19 is positioned in said T so as to disperse the solution into the water stream. Water at about 100° F. enters T 20 via conduit 45. The resulting dispersion passes through conduit 22, valve 25 and line 26. Dispersion by spray nozzle is preferred but other dispersion means such as colloid mill, mixing T, a combination of these means, or the like, can also be used. Sufficient water is admixed with the solution to provide a resulting temperature in the range of 100 to 130° F. and preferably about 120° F.

The resulting dispersion passes via conduit 22 to pressure reducing valve 25 which holds the desired pressure on the dispersion zone, for example, about 35 to 45 pounds per square inch gauge. It will be understood by those skilled in the art that other pressure reducing means can be used, e.g., sufficient length of pipe, an orifice, or the like. The material passes through line 26 directly to the stripping zone 27. The stripping zone can be operated at any desired temperature and pressure so long as solvent is vaporized. Preferably, the stripper will operate at atmospheric pressure and at about 170° F.; however, under vacuum, the temperature will be lower, e.g., 140° F. for 7 p.s.i.a. Since the polymer is lighter than water and will float, an agitator 29 is provided to maintain the solids in dispersion This agitator is rotated at a speed preferably in the range of 25 to 200 r.p.m., for example, about 85 r.p.m. While any means of supplying heat in the stripping zone can be used, steam is especially effective. Steam from conduit 30 is supplied to the steam stripper via steam nozzle head 31.

Steam and solvent vapor pass overhead from stripping zone 27 via conduit 32 to condenser 33, where most of the vapors are condensed and then pass to separation zone 34. The solvent and water form two layers in this zone 34 and water is removed via conduit 35 while solvent is removed via conduit 36. Non-condensibles and uncondensed vapor pass overhead from zone 34 via conduit 37. The polymer residence time in this stripping zone is in the range of 20 to 30 minutes.

A mixture of polymer solids and water is removed from the stripping zone 27 through conduit 38 and pump 39 and discharged through conduit 40 to skimming tank 57. Referring now to FIGURE 2, this tank comprises a first cylindrical section having a conical shaped top which is truncated by the lower terminus of inclined auger 59 and a second adjoining section 41 which has one wall 60 in common wth a wall of the first section. The second section of the skimming tank is rectangular in cross-section and of a higher elevation than the first section. Within the second section there is an adjustable weir 58 which is sealed at the bottom and open at the top whereby water entering this section from the first section flows upwardly over the weir and out of the bottom of the second section through conduit 42. The height of the weir is adjusted so that floating polymer is forced into the lower terminus of auger 59. The second section is covered at the top with a loose fitting cover plate. Communication between the two sections is provided at the bottom of the common wall. Within the first section of the skimming tank there is provided a third cylindrical section 61 of smaller cross-section which encloses the slurry entry conduit 40. This section contains a diverter shield 63 and has walls which extend upwardly to a level above the top of the opening between the first and second sections of the skimming tank.

Water leaving skimming tank 57 through conduit 42 passes to surge tank 43 and is ultimately recycled through line 45 by pump 47 to stripping zone 27, passing either through conduit 28 directly to zone 27 or through heat exchanger 49 and mixing T 20. Generally it is necessary to cool recycle water before it is passed to the dispersion zone 18. The volume of recycle water can be regulated by discharging excess water through line 44 or adding make-up water, if necessary, through line 46.

Inclined auger 59 comprises a barrel 69 which encloses a continuous screw or auger 71 having a shaft 72 extending through and supported by the closed ends of said barrel. Rotation of the auger is provided by motor 73. As previously stated, the lower terminus of the auger assembly communicates with the top of the skimming tank. The upper terminus of the auger assembly communicates with outlet conduit 50. Preferably both termini and also conduit 50 have cross-sectional areas equal to or greater than the cross-sectional areas of barrel 69 to minimize bridging of solids in the conveyor or conduit.

The inclination of auger 59 from the horizontal can vary over a substantial range from as low as 10 degrees to as high as 30 degrees or higher. In general the lower limit of the inclination depends on the height of the liquid level in the auger and the upper inclination limit is a function of the carrying capacity of the auger, which usually falls off sharply above about 30 degrees.

Wet polymer solids fall through conduit 50 into drying zone 51 where moisture is evaporated by drying gas as entering by line 52 and vented through conduit 53. Dry polymer can thus be passed through conduit 54 to extrusion zone 55 where product 56 is formed in a marketable shape, such as pellets.

In operation, polymer slurry entering the skimming tank contacts diverter 63 whereby turbulence is reduced and passes upwardly through the third section 61 and enters the main section 57 of the skimming tank. The polymer solids being lighter than the water continue upwardly past window 65 and enter the lower terminus of auger 59. By virtue of the location of adjustable weir 58 the skimming tank is operated liquid full, ordinarily with the water extending into the lower terminus of the auger. Water which separates from the polymer, passes from the main section 57 of the skimming tank into the adjacent section 41 wherein it flows upwardly over adjustable weir 58 and out through the bottom of section 41 through conduit 42. The polymer solids and water entering the auger are passed upwardly and exit from the upper terminus of the auger through conduit 50. Due to the inclination of the auger and the tumbling action of the polymer as it passes therethrough an additional amount of water is released from the polymer solids. This water flows downwardly through the auger and passes from the skimming tank through conduit 42, as previously described.

The degree of tumbling and agitation provided in the auger has a substantial effect on the amount of moisture retained by the solids discharged from the auger. A large portion of the water associated with the solids can be removed merely by draining action; however, draining alone, without movement of the solids particles with respect to each other, allows pockets of water to accumulate in the solids. Mild tumbling or agitation acts to break up these pockets and allows additional water to escape. If the tumbling or agitation becomes violent, however, there is a tendency for water to remain distributed throughout the solids and free drainage is hindered. The auger type apparatus is particularly adapted to effect the desired agitation or tumbling since usually several rotations of the auger are required to effect a complete turnover of solids passing therethrough. The optimum amount of tumbling or agitation required is a function of the velocity, loading and inclination of the auger means. The tumbling action likewise serves to improve the efficiency of the stripping operation in auger 59 by providing thorough contact between the wet polymer solids and the stripping gases.

Stripping steam is admitted to auger 59 via conduit 76 and uncondensed steam plus solvent is removed from the auger via conduit 77. As shown in the drawings, it is preferred to pass the stripping steam through the auger counter-current to the flow of solids. This is not essential, however, and our invention can be practiced by introducing the stripping steam at the lower end of the auger and removing the uncondensed steam and evaporated solvent from the upper end of the auger, in flow concurrent with the flow of solids.

The vapors in conduit 77 flow to condenser 78 wherein they are cooled and at least partially condensed. The resulting liquid is collected in knockout pot 80 and ultimately passed through conduit 82 by pump 81 (see FIGURE 1) to a phase separation zone, preferably zone 34 into which the stream is introduced below the liquid level, preferably at about the water-hydrocarbon interface. Solvent is thus recovered and passed through conduit 36 to suitable purification steps, if necessary, and storage.

Referring again to FIGURE 2 uncondensed vapors in knockout pot 80 are withdrawn through conduit 83, vacuum regulators 84, and conduit 85 to a steam ejector 86. Ejector 86 is operated by steam introduced in conduit 87 and this steam combined with vapors withdrawn from knockout pot 80 pass through conduit 88 and 76 in a recycle loop to auger 59. Thus a closed vapor system is defined by conduits 77, 83, 85, 88 and 76 with auger 59 and knockout pot 80 and there is no way for solvent vapors to escape and be lost. Ejector steam serves a double purpose by circulating the vapors through the auger 59 and stripping solvent from the solid matter.

As solids fall from auger 59 into conduit 50 it is frequently desirable to contact these solids with steam in a second stripping step. Steam entering conduit 50 through conduit 89 sweeps solvent vapor into the overhead system and evaporates additional solvent present on the wet solids falling from auger 50. Since water is also evaporated and swept upwardly with the stripping steam in such a step, the solids passing to dryer 51 carry less moisture than they do when no steam is added through line 89. Valves 93 and 94 in lines 76 and 89, respectively, can be set to obtain a desirable balance of stripping steam flow to the auger and to conduit 50.

Star valve 90 can be provided to help prevent gases from flowing through line 50 but preferably the pressure is maintained in the auger substantially the same as in the dryer to prevent gases from flowing from the dryer into the stripping system. Since our invention provides a closed vapor system in the auger stripping section, loss of inert drying gas from dryer 51 through condenser 78 is eliminated. Solids pass into screw conveyor 91 driven by motor 92 and thence into dryer 51 as previously described.

The preceding discussion and description have been directed to a preferred embodiment of the invention; however, this is not intended in any way to limit the scope of the invention. Thus although in the preceding discussion the skimmer tank has been described as having a conical shaped top it is permissable to use other shapes, including an inverted V top having vertical end sides or a multisided top, such as a pyramid, wherein each wall slopes. Other types of conveying means that provide agitation can be provided in place of auger 59. For example, a double auger with intermeshing flights can be used in which case the inclination of the auger can be increased substantially above 30 degrees. Alternatively, a continuous conveyor of the bucket or similar type adapted to agitate and tumble the solids can be used.

While our invention has been described in connection with polymer solids and hydrocarbon solvents it can likewise be used to advantage in general flotation treatments of solid-liquid mixtures wherein it is desired to recover a volatile component from the entrained liquid. Steam is used as the stripping gas because it is cheap, readily available, condensable and its use does not introduce another component which must be separated from the water in the slurry. Since our invention embodies a closed vapor system, non-condensable inert gases are not suitable for continuous addition although a fixed amount of such gas can be present in the loop and be continuously recycled.

Advantages of this invention are illustrated by the following example. The materials, and their proportions, and other specific conditions are presented as being typical and should not be construed to limit the invention unduly.

EXAMPLE

A solid ethylene polymer is prepared in a reactor in the presence of a chromium oxide catalyst, containing hexavalent chromium, having a composition of about 2.5 weight percent chromium of which about 2.2 weight percent is hexavalent chromium, associated with silica-alumina prepared by impregnating said silica-alumina with chromium trioxide solution followed by drying and activating in dry air for several hours at temperatures up to 950° F.

The reactor effluent is processed in a series of operations corresponding to those shown in FIGURE 1 of the drawing including unreacted ethylene removal, catalyst removal, effluent concentration, precipitation of the polymer in water, stripping of the precipitated slurry to remove solvent and separating polymer from water in a skim tank as shown in FIGURE 2 of the drawings.

Polymer slurry is conveyed continuously to the skim tank and polymer is removed from the slurry in auger 59 at a rate of 3500 lb./hr. (bone dry polymer basis). This polymer carries with it 70 lb./hr. of solvent. As the polymer is elevated in auger 59 permitting entrained water to drain back into the skim tank, stripping gas of steam at 60 lb./hr. and nitrogen at 10 lb./hr. saturated with 8.8 pounds of solvent is fed to the auger contacting the solids and vaporizing solvent on the polymer. The temperature in the stripping auger is 175° F. and the pressure is slightly positive, about 1 inch of water. Thirty-five hundred pounds per hour of polymer is fed to the dryer through conduit 50 and this polymer contains now only 14 pounds of solvent, 56 pounds per hour having been removed by the stripping operation. The vapor stream leaving through conduit 77 contains 10 lb./hr. nitrogen and 64.8 lb./hr. solvent including that solvent which is stripped from the polymer plus the solvent in the nitrogen recycled to the auger. Solvent with any steam present in the vapor stream is condensed in condenser 78 and the non-condensable portion, 10 lb./hr. nitrogen with 8.8 lb./hr. solvent, passes overhead from knockout pot 80 to steam ejector 86. Fifty-six pounds per hour of solvent are thus recovered in the stripping operation. The temperature in knockout pot 80 is 100° F. and the pressure is about 10 inches of water draft (below atmospheric) so that the nitrogen passing overhead leaves saturated with solvent at this temperature and pressure. Sixty pounds per hour of steam are required to operate the ejector so that the combined stripping stream previously described is formed in the ejector and is passed in recycle line 88 back to auger 59.

Without the benefit of our invention 60 lb./hr. of steam would be required to operate the ejector plus an additional 60 lb./hr. of steam to strip the solvent from the polymer in the auger. About ten pounds per hour of nitrogen would be continuously added or withdrawn from the dryer into the auger and removed from the system, saturated with 8.8 pounds of solvent. Solvent recovery without recycle of non-condensable gas would thus be reduced to 47.2 pounds per hour. The additional amount of solvent recovery enabled by our invention produces sizable annual savings when applied to large plant operations. Additional advantages also accrue from the savings in stripping steam and inert gas which must be continuously generated and supplied to the dryer.

As will be evident to those skilled in the art, various modifications of this invention can be made, or followed, in the light of the foregoing disclosure and discussion, without departing from the spirit or scope thereof.

We claim:
1. In a process wherein floatable solids are skimmed from a slurry of said solids in liquid comprising a low-boiling component and conveyed from said slurry in a confined zone, the improved method of removing said low-boiling component from said solids being so conveyed which comprises contacting said solids being conveyed with steam containing an inert gas thereby vaporizing low-boiling component being carried with said solids and forming a gaseous stream comprising vapors of said low-boiling component, steam and said inert gas, cooling said stream and thereby condensing said vapors and steam, separating thus formed condensate from said inert gas in a separation zone, pulling said inert gas from said separation zone with a steam ejector, operating said ejector with fresh steam thereby mixing said steam with said inert gas, and passing the thus formed mixture to said confined zone for further stripping of low-boiling component from said solids.

2. A process according to claim 1 wherein said inert gas is nitrogen.

3. A process according to claim 1 wherein said solids are particles of olefin polymer and said low-boiling component is a hydrocarbon.

4. A process according to claim 3 wherein said polymer is polyethylene.

5. In apparatus including a skimming tank, a dryer and a conveyor operating within an elongated housing for transferring solids from said skimming tank to said dryer, the improvement comprising, in combination, a condenser, first conduit means communicating said housing with the inlet of said condenser, a vapor-liquid separator, second conduit means communicating the outlet of said condenser with said separator, a steam ejector connected to a steam source, third conduit means communicating said separator and the inlet of said ejector, and fourth conduit means communicating the outlet of said ejector with said housing.

References Cited by the Examiner

UNITED STATES PATENTS

| | | | |
|---|---|---|---|
| 1,494,830 | 4/1924 | Cook | 264—37 |
| 2,321,923 | 6/1943 | Levine et al. | 23—270 |
| 2,447,845 | 8/1948 | Dinley | 23—270 |
| 2,624,955 | 1/1953 | Robinson | 34—92 |
| 2,908,734 | 10/1959 | Cottle | 260—683.15 |
| 2,944,047 | 7/1960 | Schutze | 260—94.9 |
| 2,957,861 | 10/1960 | Goins | 260—94.9 |

OTHER REFERENCES

Perry, J. H.: "Chemical Engineers' Handbook," 3 Ed., pp. 1453–6, McGraw-Hill Book Co., Inc., New York, 1950.

JOSEPH L. SCHOFER, *Primary Examiner.*

BEN E. LANHAM, LESLIE H. GASTON, MORRIS LIEBMAN, WILLIAM H. SHORT, *Examiners.*

R. E. WEXLER, M. C. JACOBS, J. T. YOUNG, S. ASTOR, F. L. DENSON, *Assistant Examiners.*